United States Patent Office 2,844,556
Patented July 22, 1958

2,844,556

PROCESS FOR THE PROMOTION OF THE LOW HYSTERESIS PROCESSING OF RUBBER USING IODOFORM

Kenneth W. Doak, Bloomfield, N. J., assignor to United States Rubber Company, New York, N. Y., a corporation of New Jersey No Drawing. Application May 31, 1955
Serial No. 512,301

5 Claims. (Cl. 260—41.5)

This invention relates to improvements in the technique of processing carbon black and rubber mixes prior to vulcanization thereof.

The technique of processing rubber mixes loaded with carbon black, prior to vulcanization thereof, whereby to obtain vulcanizates with improvements in physical and chemical properties, is described in Gerke et al. U. S. Patent 2,118,601. The improved vulcanizates prepared by the technique of Gerke et al. differ from the usual vulcanizates produced by older techniques in that they have relatively (1) lower modulus at low elongation, (2) higher modulus above 300% elongation, (3) higher resistance to abrasion (4) lower torsional hysteresis, and (5) higher electrical resistivity, and are (6) relatively softer.

The improved vulcanizates of Gerke et al. are obtained by incorporating uniformly in the rubber a relatively large amount of carbon black, for example, at least 25 parts, and preferably in the case of tire treads at least 40 parts, by weight of carbon black per 100 parts by weight of rubber, and subjecting the mixture to a heat treatment at a temperature substantially about 250° F., the preferred temperature being in the range from about 300° F., to 370° F., and masticating the mix during and/or after such heat treatment, or alternately therewith. The duration of the special heat treatment varies with the temperature employed, the higher the temperature the shorter the time, and is governed also by the degree of change desired in the properties of the ultimate vulcanized product which properties are gauged to be compatible with its final use. In general, heat treatments of from 10 to 60 minutes duration are said to be suitable for most purposes, particularly within the preferred temperature range.

The principal object of the present invention is to provide a new chemical promoter for the processing of rubber and carbon black mixtures at relatively high temperatures, as in processes of the general type disclosed in the above-mentioned Gerke et al. patent. Such processing is often referred to as low-hysteresis processing and is usually designed to produce high electrical resistance and low torsional hysteresis, particularly in rubber stocks used for the manufacture of pneumatic tires and more particularly tread stocks. A further object is to bring about a substantial reduction in the time of such processing by the use of the herein disclosed chemical whereby an important increase in the capacity and output of the equipment is obtained with the result that such processing is rendered commercially feasible. Other objects and advantages of our invention will more fully hereinafter appear.

The present invention is based upon my discovery that iodoform substantially decreases the time and/or lowers the temperature necessary for so-called low-hysteresis processing of rubber and carbon black mixes, that is, the rate of the low-hysteresis processing reaction, at a given temperature, is materially increased.

The process of my invention comprises mixing rubber with a relatively large amount of a rubber-reinforcing carbon black and a relatively small amount of iodoform and heating this mixture at a temperature of from 275° F. to a temperature just short of that at which the properties of the rubber would be injured by thermal decomposition to bring about the desired changes in the rubber and carbon black mixture. With the resulting heat-treated mixture there are then incorporated vulcanizing agents, almost invariably including sulfur, and other desired compounding ingredients including conventional accelerators and the like, these being intimately incorporated in any suitable way after which the mixture is shaped and vulcanized in the usual way.

Any carbon black which is capable of reinforcing the rubber can be used in the practice of my invention. I generally employ either furnace black or channel black. It will be understood that the particular type of carbon black will generally be selected with reference to the particular rubber used, this being a matter well within the skill of the art. The amount of carbon black present during the heat treatment should be equal to at least 25 parts per 100 parts by weight of rubber. Preferably the amount of carbon black is equal to at least 40 parts per 100 parts of rubber, the use of such high proportions of carbon black being particularly desirable in the case of tread stocks. The amount of carbon black present during the heat treatment can range as high as 100 parts per 100 parts of rubber.

My invention can be practiced with any vulcanizable, aliphatic conjugated diolefin hydrocarbon polymer rubber, e. g., Hevea rubber and those synthetic rubbers which are either homopolymers of aliphatic conjugated diolefin hydrocarbons, especially butadiene and isoprene, examples of such homopolymers being synthetic polybutadiene and polyisoprene, or copolymers of such aliphatic conjugated diolefin hydrocarbons with other ethylenically unsaturated copolymerizable monomeric compounds, e. g., copolymers of butadiene with styrene, isobutylene, alphamethylstyrene, para-methyl alpha-methyl styrene, acrylonitrile, monovinylpyridines, ethyl acrylate, methyl vinyl ketone, methyl isopropenyl ketone, methyl acrylate, and methyl methacrylate. My invention is applicable with Butyl rubber which, as is well known, is a synthetic rubbery copolymer of a major proportion of isobutylene, typically 90–99.5% thereof, and a minor proportion, typically 10–0.5%, of an aliphatic conjugated diolefin hydrocarbon especially butadiene or isoprene.

The amount of iodoform employed in the practice of my invention is equal to from 0.75 to 5 parts per 100 parts of rubber. Amounts materially less than 0.75 part do not give the desired promoting effect and amounts much greater than 5 parts are uneconomical to use. Optimum amounts and temperatures will depend upon the rubber being used and the degree of change desired in the vulcanizate.

The iodoform should be incorporated with the rubber and carbon black at relatively low temperature, typically not over 250° F., to avoid premature reaction of the iodoform with the rubber. Such premature reaction would lessen the efficiency and effectiveness of our treatment.

In the preferred practice of my invention, the heat treatment of the mixture of rubber, carbon black and iodoform is carried out by mastication at 275°–400° F., with any suitable type of masticating equipment such as an open two-roll rubber mill or more preferably an internal rubber mixer, especially a Banbury mixer. A Banbury mixer is particularly advantageous because it exerts a severe masticatory action upon the charge and because it conserves the heat generated by the mixing action, and this heat greatly aids in elevating the temperature of the stock to within the specified range. Depending upon the size and operating speed of the Banbury mixer, and other factors, extraneous heat may or may not need to be applied to bring the stock temperature within the desired temperature range and hold it there. In some cases it may be necessary to apply extraneous cooling to keep the stock temperature from rising above the desired level.

The optimum duration of the masticatory heat treatment may vary widely depending upon many factors including the temperature of the heat treatment, type of mixer, amount of iodoform, etc. In any case it will be considerably shorter, under like temperature conditions, than the time required when the promoter is omitted. Times of the order of 5 to 20 minutes will generally be adequate for the purposes of our invention.

Generally speaking, when Butyl rubber is employed in the practice of my invention, the severity of the heat treatment in terms of temperature or duration or both, will be greater than when other rubbers are used.

The process of my invention comprises the following essential steps:

(1) Mixing thoroughly the rubber and the carbon black, and then mixing in the iodoform at a relatively low temperature at which the iodoform does not substantially react with the rubber.

(2) Heat-treating the resulting mixture, either by mastication or statically, at a stock temperature of at least 275° F. ranging upwardly to a temperature just below that at which the rubber would be injured, for a time sufficiently long to substantially increase the electrical resistivity and substantially decrease the torsional hysteresis of a vulcanizate of the heat-treated mixture.

(3) Masticating the mixture, either during or subsequent to the heat treatment or alternately therewith. Where the heat treatment is done statically, this mastication may be performed incident to Step 4.

(4) Incorporating vulcanizing ingredients, almost invariably including sulfur, in amount and of a type such as to completely cure the rubber, and any other desired compounding ingredients. These ingredients are usually incorporated during mastication following the heat treatment. They are incorporated at a temperature sufficiently low to preclude vulcanization.

(5) Shaping.

(6) Vulcanizing the shaped mixture.

The following examples illustrate the preferred method of practicing my invention. All parts expressed herein are by weight.

Example 1

A masterbatch is prepared by mixing together 100 parts of natural rubber, 50 parts of carbon black (a medium processing channel black known as "Spheron 6"), and 5 parts of stearic acid. To 155 parts of this masterbatch is added on a two-roll rubber mill 4.0 parts of iodoform at a temperature preferably below 275° F. The mill temperature is raised to 300° F. and the mixture is masticated for 10 minutes. Thereafter the mill is cooled to 150–200° F., and 2 parts of pine tar, 2 parts of zinc oxide, one part of antioxidant, one part of accelerator, and 2.6 parts of sulfur are incorporated. The mixture is vulcanized in a suitable mold for 45 minutes at 287° F. As a control, an identical masterbatch is prepared and subjected to the same manipulative steps, except that no iodoform is added. The specific electrical resistivity and the torsional hysteresis are measured, with the following results:

| Promoter | ML-4 (212° F.) | Log Resistivity | Tors. Hyst., 280° F. |
|---|---|---|---|
| None | 44 | 7.2 | 0.127 |
| Iodoform | 43 | >13.0 | .055 |

The practice of the invention has increased the specific electrical resistivity by a factor of at least 900,000 and has reduced the torsional hysteresis by over 55%.

Example 2

To a masterbatch of 100 parts of a copolymer of isoprene and isobutylene (known commercially as "Butyl 15") and 50 parts of carbon black ("Spheron 6") is added 1.5 parts of iodoform. This mixture is masticated for 15 minutes at 375° F. in a Banbury mixer. Vulcanizing ingredients (one part of stearic acid, 5 parts of zinc oxide, 0.5 part of 2-mercaptobenzothiazole, one part of tetramethylthiuram disulfide, and 2 parts of sulfur) are mixed into the stock at about 200° F. The stock is vulcanized for 45 minutes at 293° F. A control stock is subjected to all the previously described manipulative steps except that no promoter is used. Specific electrical resistivity and torsional hysteresis are measured, with the following results:

| Promoter | ML-4 (212° F.) | Log Resistivity | Tors. Hyst., 280° F. |
|---|---|---|---|
| None | 64 | 6.9 | 0.166 |
| Iodoform | 66 | >13.0 | .081 |

The practice of the invention has increased the specific electrical resistivity by a factor of over 1,000,000, and has reduced the torsional hysteresis by over 50%.

Example 3

To a masterbatch of 100 parts of a butadiene-styrene rubbery copolymer (GR–S polymerized at 41° F.), 52 parts of medium processing channel black, and 6 parts of hydrocarbon softener, is added 2.0 parts of iodoform at about 200° F. The mixture is masticated for 8 minutes at 325° F. Vulcanizing ingredients (3 parts of zinc oxide, 2.0 parts of sulfur, 1.0 part of stearic acid, and a suitable accelerator) were added at about 200° F. The stock, after vulcanization has a log resistivity of over 13.0. A control stock, which had an identical treatment except that it had no promoter added, had a log resistivity of 10.8.

Although I have disclosed my invention with particular emphasis upon the preferred practice wherein the heat treatment is accompanied with mastication, nevertheless my invention can be practiced by carrying out the heat treatment under static conditions. For example, I may form an intimate mixture of the rubber, carbon black and iodoform in any suitable manner and then heat this mixture at 275°–400° F. without simultaneously masticating it, the heat-treated mixture being subsequently masticated and compounded with conventional compounding and vulcanizing ingredients. The static heat treatment can be conducted by placing slabs of the stock in an oven heated to a suitable temperature, or slabs of the stock can be stacked and allowed to stand for several hours, preferably under relatively non-heat-conductive conditions in order to maintain the stock at the high temperature for as long as reasonably possible. It may be desirable to surround the slabs of hot stock with a heat-insulating blanket of any suitable type in order that the residual heat of the slabs may be retained as long as possible.

Static heat treatment has the advantage of releasing the milling or Banbury equipment from use for carrying out the heat treatment of my invention, and this may be highly desirable under some conditions.

The electrical resistivity values given in the above examples were determined by measuring the resistance of a specimen of known thickness (about 0.1 inch) placed between mercury electrodes, under a potential difference of 135 volts, using a sensitive galvanometer with an Ayrton shunt. The logarithm (to base 10) of the specific electrical resistivity (in ohm-cms.) is designated "Log Resistivity."

The torsional hysteresis figures represent the logarithmic decrement (to base 10) of the observed amplitudes of successive oscillations of a torsion pendulum, measured at 280° F. with an apparatus consisting essentially of a torsion pendulum in which the sample of rubber tested supplies the restoring force when the pendulum is deflected. For further description of this test see Gerke et al. 2,118,601.

Having thus described my invention, what I claim and desire to protect by Letters Patent is:

1. A process which comprises mixing vulcanizable aliphatic conjugated diolefin hydrocarbon polymer rubber with a relatively large amount of a rubber-reinforcing carbon black and from 0.75 to 5 parts of iodoform per 100 parts of said rubber, heating the mixture at a temperature of at least 275° F. but insufficiently elevated to substantially injure the properties of the rubber, masticating the mixture and incorporating vulcanizing and other desired ingredients, shaping the mixture, and vulcanizing the shaped mixture.

2. A process which comprises mixing vulcanizable aliphatic conjugated diolefin hydrocarbon polymer rubber with a relatively large amount of a rubber-reinforcing carbon black and from 0.75 to 5 parts of iodoform per 100 parts of said rubber, masticating the mixture at a temperature of at least 275° F. but insufficiently elevated to substantially injure the properties of the rubber, thereafter incorporating vulcanizing and other desired ingredients, shaping the mixture, and vulcanizing the shaped mixture.

3. A process which comprises mixing natural rubber with a relatively large amount of a rubber-reinforcing carbon black and from 0.75 to 5 parts of iodoform per 100 parts of said rubber, masticating the mixture at a temperature of from 275 to 400° F., thereafter incorporating vulcanizing and other desired ingredients, shaping the mass, and vulcanizing the resulting shaped mass.

4. A process which comprises mixing a rubbery butadiene-styrene copolymer with a relatively large amount of a rubber-reinforcing carbon black and from 0.75 to 5 parts of iodoform per 100 parts of said copolymer, masticating the mixture at a temperature of from 275 to 400° F., thereafter incorporating vulcanizing and other desired ingredients, shaping the mass and vulcanizing the resulting shaped mass.

5. A process which comprises mixing a rubbery isobutylene aliphatic conjugated diolefin hydrocarbon copolymer with a relatively large amount of a rubber-reinforcing carbon black and from 0.75 to 5 parts of iodoform per 100 parts of said copolymer, masticating the mixture at a temperature of from 275 to 400° F., thereafter incorporating vulcanizing and other desired ingredients, shaping the mass, and vulcanizing the resulting shaped mass.

References Cited in the file of this patent

UNITED STATES PATENTS

| | | |
|---|---|---|
| 2,658,092 | Barton | Nov. 3, 1953 |
| 2,689,842 | Barton | Sept. 21, 1954 |
| 2,710,287 | Barton et al. | June 7, 1955 |
| 2,720,499 | Doak | Oct. 11, 1955 |
| 2,734,885 | Doak | Feb. 14, 1956 |
| 2,734,887 | Doak et al. | Feb. 14, 1956 |